(12) United States Patent
Cudini et al.

(10) Patent No.: US 6,556,447 B2
(45) Date of Patent: Apr. 29, 2003

(54) ELECTRONIC APPARATUS WITH AN ENCLOSURE

(75) Inventors: Roberto Cudini, Basel (CH); Bruno Worreth, Kiffis (FR)

(73) Assignee: Endress + Hauser Flowtec AG, Reinach (CH)

(*) Notice: Subject to any disclaimer, the term of this patent is extended or adjusted under 35 U.S.C. 154(b) by 108 days.

(21) Appl. No.: 09/789,169

(22) Filed: Feb. 20, 2001

(65) Prior Publication Data

US 2001/0053065 A1 Dec. 20, 2001

Related U.S. Application Data

(60) Provisional application No. 60/207,991, filed on May 26, 2000.

(30) Foreign Application Priority Data

Mar. 1, 2000 (EP) ............................................ 00 10 4223

(51) Int. Cl.$^7$ ................................................ H05K 5/06
(52) U.S. Cl. ....................... 361/752; 361/728; 361/756; 361/759; 174/52.1
(58) Field of Search ................................. 361/728–733, 361/736, 740, 741, 747–748, 752, 756, 759, 800–803; 174/50.52, 52.1, 52.4, 59–60; 220/3.2, 4.02; 439/604, 77, 493

(56) References Cited

U.S. PATENT DOCUMENTS

| 4,591,950 | A | | 5/1986 | Houpt |
| 4,796,159 | A | * | 1/1989 | Miksche ..................... 361/832 |

FOREIGN PATENT DOCUMENTS

| EP | 0 945 714 | 9/1999 |
| WO | WO 99/23725 | 5/1999 |

* cited by examiner

Primary Examiner—David Martin
Assistant Examiner—Phuong T. Vu
(74) Attorney, Agent, or Firm—Bose McKinney & Evans LLP

(57) ABSTRACT

The electronic apparatus (1) has an enclosure (10), which has a terminal compartment (12) and an electronics compartment (11). These two compartments are separated by an internal wall (13) which has a longitudinal slot (131) of depth T in which a bushing (14) is fitted. The bushing is to be flameproof designed. To this the enclosure (10) comprises: 1) A baseboard (141) which extends into and is mounted in the electronics compartment, has a stop (142), and can be fitted with electronic components (143); 2) a lead arrangement (144) extending into the terminal compartment (12) and contacting the components on the baseboard; and 3) a plastic part (146) which surrounds the lead arrangement, is formed integrally with the stop (142), and has the shape of, and thus fills, the longitudinal slot (131).

20 Claims, 3 Drawing Sheets

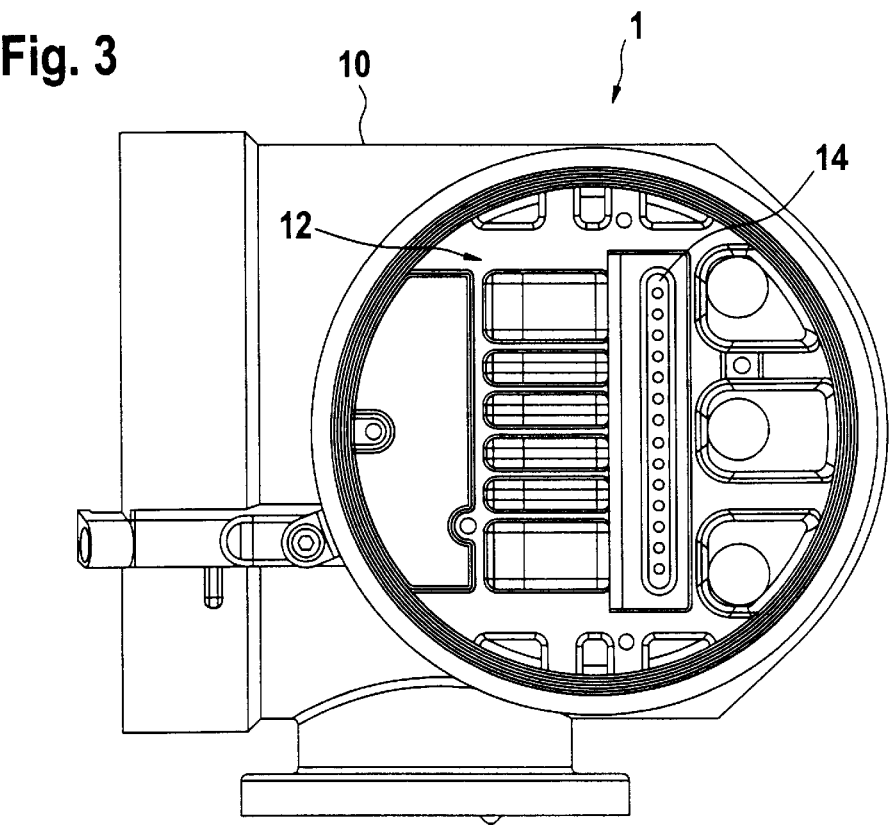
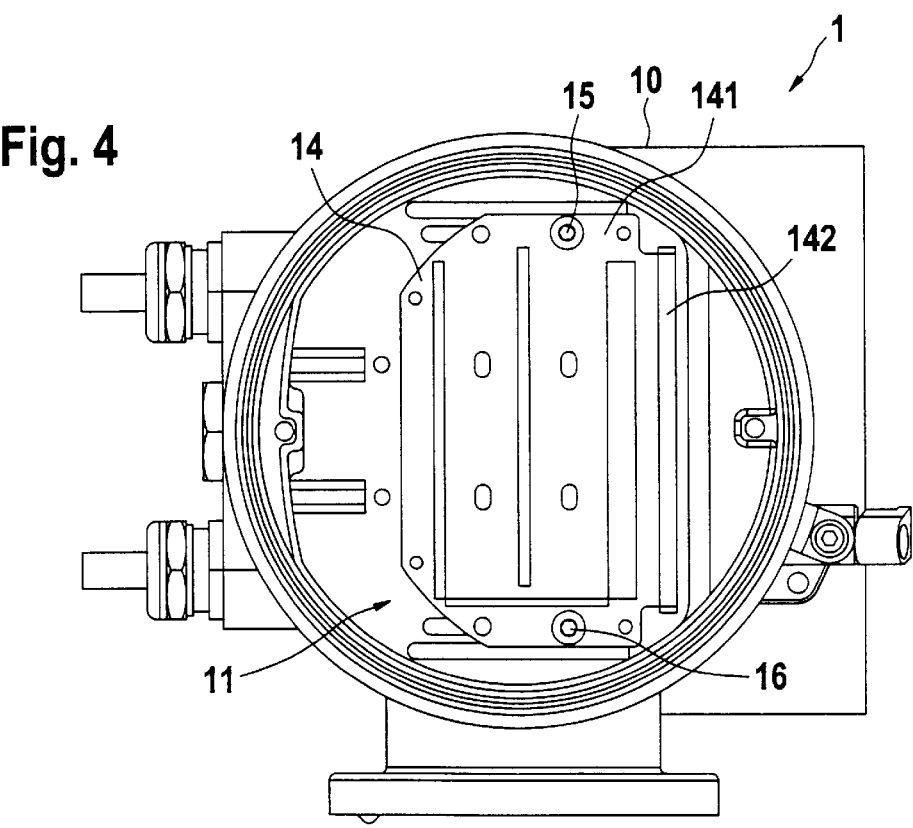

ELECTRONIC APPARATUS WITH AN ENCLOSURE

CROSS-REFERENCE OF RELATED APPLICATIONS

This application claims the benefit of U.S. Provisional Patent Application No. 60/207,991, entitled "Electronic Apparatus with an Enclosure", filed May 26, 2000, the disclosure of which is incorporated herein by reference for all purposes. This application is related to EP Application Serial No. 00 10 4223.3, filed Mar. 1, 2000, the disclosure of which is incorporated herein by reference for all purposes.

FIELD OF THE INVENTION

This invention relates to an electronic apparatus with an enclosure having a terminal compartment and an electronics compartment.

BACKGROUND AND SUMMARY OF THE INVENTION

One reason for the presence of the terminal compartment and the electronics compartment is that a circuit housed in the electronics compartment is to be protected against deliberate or accidental contact when work is being done in the terminal compartment, i.e., when a line or a cable is being connected, for example.

To ensure that such apparatus can perform its electronic function, the apparatus is connected to an electric power supply, such as a battery; for the most part, however, the apparatus is powered from a power supply system, particularly a public system. Also, means are generally provided for transmitting signals, e.g., measurement and/or control signals, from and/or to the apparatus.

Electronic apparatus, particularly industrial measuring instruments, is also operated in locations in which there is a danger of explosion, i.e., the electronic apparatus is located not in normal air, but in a potentially explosive atmosphere. Examples of environments in which potentially explosive atmospheres are present or may arise are silos for powdery materials, particularly for flour, gas stations, aircraft refuelling points, or industrial plants, particularly chemical plants.

Therefore, electronic apparatus that is to be usable in hazardous areas are subject to special safety regulations, which are defined in standards. The main objects of those standards are to avoid an electric spark that may initiate an explosion, or to prevent a spark produced inside an enclosed space from causing an explosion outside, or to ensure that a flame that has already developed will be confined to the space in which it has developed. These objects are attainable in various ways, which are referred to in relevant Europeans standards as "types of protection".

According to European Standards EN 50014 and EN 50018, for example, which standards are incorporated herein by reference for all purposes, explosion protection is provided if electronic apparatus is designed to meet the requirements of the type of protection "explosionproof enclosure (Ex-d)" (English designation in the standard: flameproof enclosure "d"). This is commonly called "type of protection Ex-d".

Furthermore, according to European Standards EN 500014 and EN 50020, which standards are incorporated herein by reference for all purposes, explosion protection is provided if electronic apparatus is designed to meet the requirements of the type of protection "intrinsic safety (Ex-i)", which is commonly referred to as "type of protection Ex-i". According to this type of protection, electric currents, voltages, and powers occurring in the electronic apparatus must not exceed predetermine current, voltage, and power limit values at any time.

These three limit values are chosen so that in the event of a fault or a short circuit, the maximum amount of energy released does not suffice to produce a spark capable of causing ignition. The voltage is kept below the predetermined limit values by zener diodes, for example, the current is limited by resistors, for example, and the power is limited by a suitable combination of voltage- and current-limiting components.

In European Standard EN 50019, which standard is incorporated herein by reference for all purposes, a further type of protection with the designation "increased safety (Ex-e)" is defined, which is commonly called "type of protection Ex-e". In electronic apparatus designed to meet the requirements of this type of protection, explosion protection is achieved by making the distances between two electric conductors having different potentials so great that sparking cannot occur across this distance. To meet these requirements, however, circuits may have to be very large in dimensions.

In the USA, Canada, Japan, and other countries, there are standards comparable to those European standards.

Electronic apparatus designed to meet the requirements of type of protection Ex-d must have an explosionproof enclosure or an explosionproof part of the enclosure. This prevents any explosion occurring inside the enclosure or a compartment thereof from penetrating to the outside or to another compartment, e.g., from the electronics compartment to the terminal compartment. In the standard, minimum values are defined for the length and width of slots or gaps etc. between compartments at which the slots or gaps etc. are flameproof.

In order to have sufficient mechanical strength, enclosures with explosionproof parts are thick-walled; hence, they are heavy and expensive. Designing electronic apparatus to meet the requirements of type of protection Ex-d thus requires an explosionproof and, thus, heavy and expensive enclosure or an enclosure with a suitably dimensioned part.

EP-A 945 714 corresponding to U.S. patent application Ser. No. 09/268,343, filed Mar. 16, 1999 discloses an electronic apparatus with an enclosure having an electronics compartment and a terminal compartment which meets the requirements of type of protection Ex-d or type of protection Ex-e,
 is spatially separated from the electronics compartment, which houses a circuit complying with the requirements of type of protection Ex-i, and
 is electrically connected to the electronics compartment by a commercially available explosionproof bushing.

Since in this electronic apparatus, a circuit that meets the requirements of type of protection Ex-i is already present in the electronics compartment, neither sparks nor flames can originate from it, so that the bushing need not be flameproof.

If, however, circuits that do not meet the requirements of type of protection Ex-i are provided in the electronics compartment, the bushing required between terminal compartment and electronics compartment must be designed to be flameproof.

It is an object of the invention to provide an electronic apparatus in which the aforementioned explosion protection is achieved with an elegant and low-cost design.

To attain this object, the invention consists in an electronic apparatus with an enclosure which has a terminal compartment and an electronics compartment, said terminal compartment being separated from the electronics compartment by an internal wall which has a longitudinal slot of depth T in which a bushing is fitted, and which comprises:
- a baseboard which extends into and is mounted in the electronics compartment, has a stop, and can be fitted with electronic components;
- a lead arrangement extending into the terminal compartment and contacting the components on the baseboard; and
- a plastic part which surrounds the lead arrangement, is formed integrally with the stop, and has the shape of, and thus fills, the longitudinal slot.

In a first preferred embodiment of the invention,
the enclosure is located in a hazardous area,
the electronics compartment is designed to comply with the requirements of type of protection Ex-d,
the electronics compartment houses a circuit designed to comply with the requirements of type of protection Ex-d, and
the depth T of the longitudinal slot is at least equal to the gap length specified for type of protection Ex-d as a function of gap width.

In a second preferred embodiment of the invention, the terminal compartment is designed either to comply with the requirements of type of protection Ex-d or to comply with the requirements of type of protection Ex-e or to comply with the requirements of another type of protection or not to comply with any type of protection.

In a third preferred embodiment of the invention, the plastic part and the stop are made of polybutylene terephtalate.

One advantage of the invention is that explosion protection between terminal compartment and electronics compartment is achieved in a simple manner, namely, on the one hand, by suitably dimensioning the longitudinal slot in the internal wall and, on the other hand, by combining the baseboard, the associated lead arrangement, and the plastic part into a prefabricated bushing assembly. During the manufacture of the apparatus, this unit only needs to be inserted into the longitudinal slot.

The invention and further advantages will become more apparent by reference to the following description of an embodiment of the invention taken in conjunction with the accompanying drawings, in which like parts are designated by like reference numerals throughout the various figures.

BRIEF DESCRIPTION OF THE DRAWINGS

FIG. 3 is a view of the enclosure of FIG. 1 looking directly into the terminal compartment, with the bushing assembly inserted;

FIG. 4 is a view of the enclosure of FIG. 1 looking directly into the electronics compartment, withthe bushing assembly inserted.

DETAILED DESCRIPTION OF EXEMPLARY EMBODIMENTS

Figure 1:
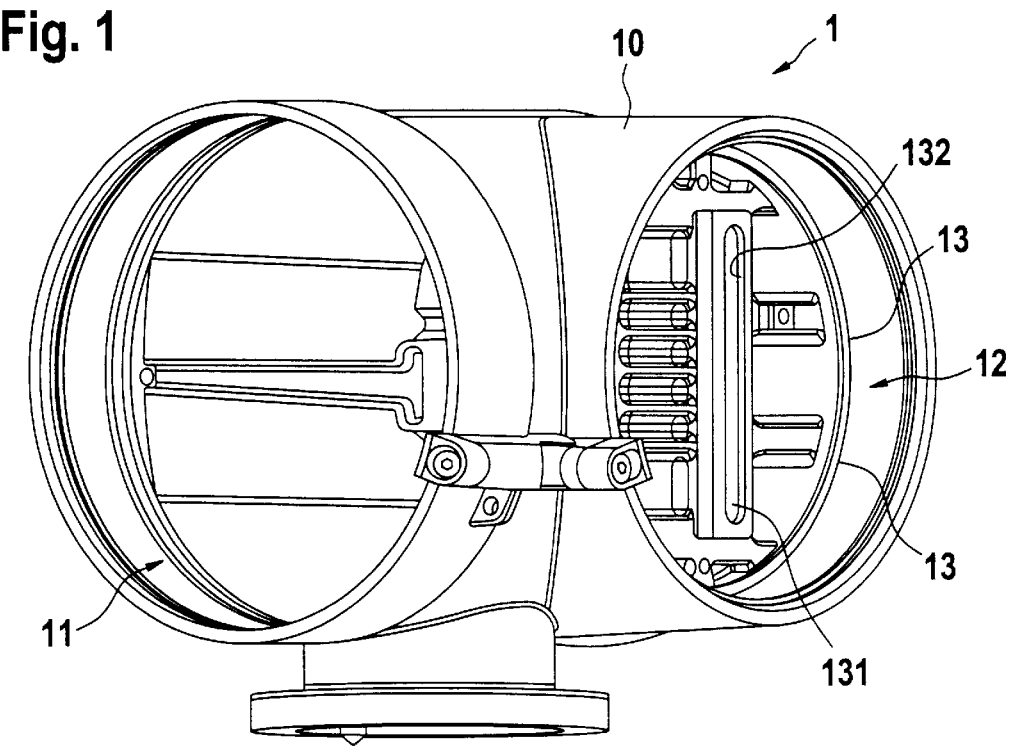
FIG. 1 shows an electronic apparatus in perspective with a view into the electronics compartment and the terminal compartment, with no bushing assembly inserted.

FIG. 1 shows an enclosure 10 of an electronic apparatus 1 in perspective with a view into an electronics compartment 11 and a terminal compartment 12 of the apparatus 1. Electronics compartment 11 commonly houses electronic and mechanical components of, e.g., evaluation electronics of a measuring instrument, such as an instrument for measuring pressure, tank-contents level, temperature, pH value, mass or volumetric flow rate, or conductivity, etc.

Furthermore, terminal compartment 12 usually contains electronic and mechanical components which serve to connect external leads for power supply and/or for the transfer of signals generated by the evaluation electronics.

Figure 2:
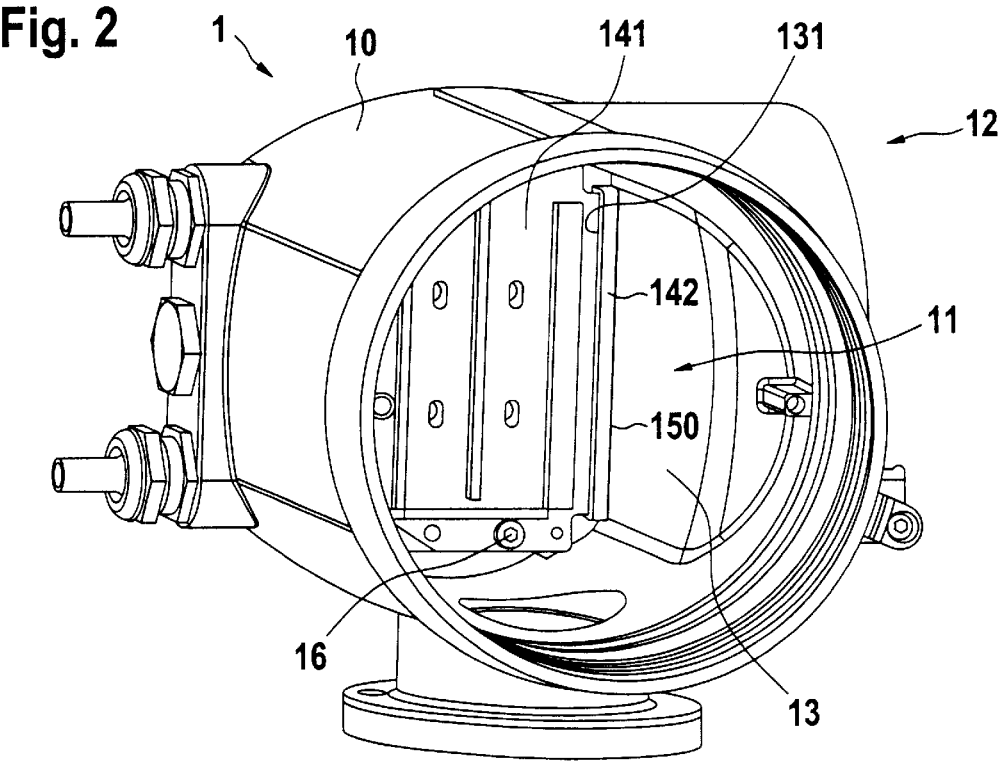
FIG. 2 shows the enclosure of FIG. 1 in perspective from another direction with a view into the electronics compartment, with the bushing assembly inserted.

As shown in FIG. 2, electronics compartment 11 and terminal compartment 12 in enclosure 10 are spatially separated from each other by an internal wall 13, which has a longitudinal slot 131. The latter has a depth T perpendicular to its longitudinal direction, this depth being preferably at least equal to the length specified by the standard for intrinsic safety as a function of its width.

Figure 5:
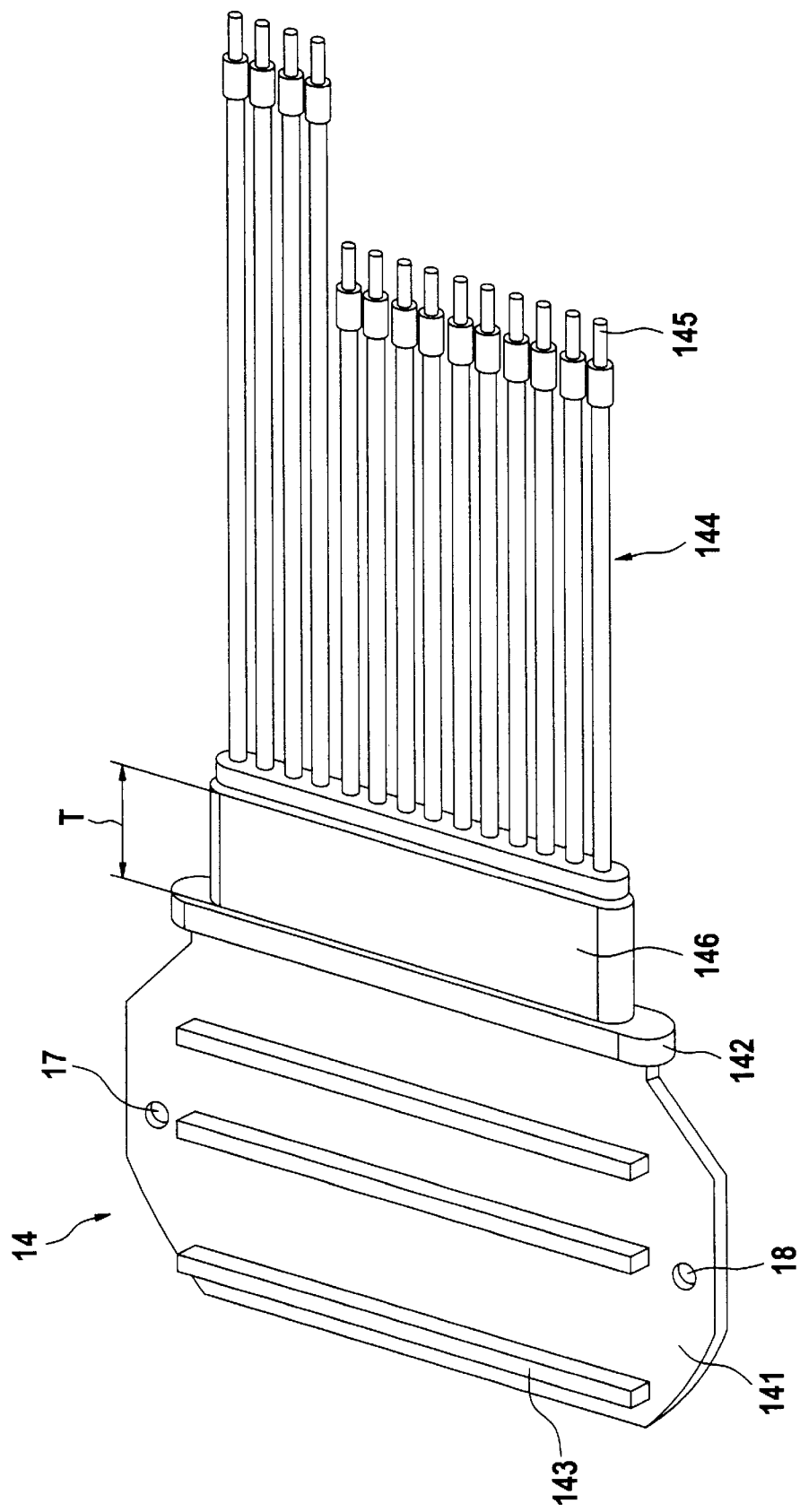
FIG. 5 is a perspective view of the bushing assembly.

As shown in FIGS. 2 to 4, a bushing assembly 14, shown separately in FIG. 5, has been fitted into longitudinal slot 131. It comprises a baseboard 141 which extends into the electronics compartment and is attached therein, e.g., by means of screws; cf. the two screws 15, 16, which have been screwed into corresponding threads provided in enclosure 10, and the two associated holes 17, 18 in baseboard 141.

Bushing assembly 14 has a stop 142 which rests against a surface of internal wall 13 on the side of the longitudinal slot, preferably with a sealing ring interposed between this surface and the stop.

Baseboard 141 may be fitted with electronic components 143, preferably forming a printed circuit; in FIG. 5, components 143 are indicated only schematically.

A preferably flexible lead arrangement 144, which contacts components 143 on baseboard 14, for example, extends into terminal compartment 12. FIG. 5 shows a preferred embodiment of lead arrangement 144 in the form of several single leads. The latter may also be combined in a flat cable. At their respective free ends, the single leads are provided with plugs 145.

Lead arrangement 144 is surrounded by a plastic part 146 which has the three-dimensional shape of longitudinal slot 131, 60 that it practically fills, and thus can be fitted into, the latter, with a maximum gap clearance of 0.15 mm being permissible in accordance with the above-mentioned standards, for example.

On the side of the baseboard, stop 142 is formed integrally with plastic part 146. The width of plastic part 146 is equal to the depth T of longitudinal slot 131. Stop 142 and plastic part 146 are preferably made of polybutylene terephtalate.

When enclosure 10 is located in a hazardous area, electronics compartment 11 will preferably be designed to meet the requirements of type of protection Ex-d. Furthermore, the depth T of longitudinal slot 131 will be at least equal to the sparking distance specified for type of protection Ex-d.

In any case, terminal compartment 12 can be designed to comply with type of protection Ex-d or type of protection Ex-e or another type of protection, such as Ex-m, or not to comply with any type of protection.

What is claimed is:

1. An electronic apparatus with an enclosure having a terminal compartment and an electronics compartment, said terminal compartment being separated from said electronics compartment by an internal wall having a longitudinal slot fitted with a bushing, said bushing comprising:

a baseboard extending into the electronics compartment, said baseboard being fitted with electronic components;

a stop designed to prevent any disengaging of the bushing from said slot into said terminal compartment;

a lead arrangement extending into the terminal compartment and contacting the components on the baseboard; and a plastic part extending into said longitudinal slot and surrounding a part of said lead arrangement, said plastic part being formed integrally with the stop and having a shape corresponding with a shape of the longitudinal slot;

wherein said lead arrangement includes a flat cable at least partially surrounded by said plastic part.

2. The apparatus as claimed in claim 1, wherein the electronics compartment and the bushing are designed to prevent any explosions inside said electronics compartment from penetrating to said terminal compartment.

3. The apparatus as claimed in claim 2, wherein any gaps between said longitudinal slot and said plastic part extending therein are designed to be flameproof.

4. The apparatus as claimed in claim 3, wherein any gaps between said longitudinal slot and said plastic part having a length being flameproof.

5. The apparatus as claimed in claim 3, wherein any gaps between said longitudinal slot and said plastic part having a width being flameproof.

6. The apparatus as claimed in claim 2, wherein the plastic part and the stop are made of polybutylene terephtalate.

7. The apparatus as claimed in claim 1, wherein the longitudinal slot has a depth being designed to prevent sparking across said slot.

8. The apparatus as claimed in claim 1, wherein the stop is formed with said baseboard.

9. The apparatus as claimed in claim 1, wherein said stop resting against said internal wall.

10. The apparatus as claimed in claim 1, wherein to prevent any disengaging of the bushing from said slot back to said electronics compartment the bushing is attached to said enclosure by means of screws screwed into threads provided in said enclosure and into holes in said baseboard associated with said threads.

11. An electronic apparatus with an enclosure having a terminal compartment and an electronics compartment, said terminal compartment being separated from said electronics compartment by an internal wall having a longitudinal slot fitted with a bushing, said bushing comprising:

a baseboard extending into the electronics compartment, said baseboard being fitted with electronic components;

a stop designed to prevent any disengaging of the bushing from said slot into said terminal compartment, a lead arrangement extending into the terminal compartment and contacting the components on the baseboard; and a plastic part extending into said longitudinal slot and surrounding a part of said lead arrangement, said plastic part being formed integrally with the stop and having a shape corresponding with a shape of the longitudinal slot;

wherein to prevent any disengaging of the bushing from said slot back to said electronics compartment the bushing is attached to said enclosure by means of screws screwed into threads provided in said enclosure and into holes in said baseboard associated with said threads.

12. The apparatus as claimed in claim 11, wherein the electronics compartment and the bushing are designed to prevent any explosions inside said electronics compartment from penetrating to said terminal compartment.

13. The apparatus as claimed in claim 10, wherein any gaps between said longitudinal slot and said plastic part extending therein are designed to be flameproof.

14. The apparatus as claimed in claim 11, wherein any gaps between said longitudinal slot and said plastic part having a length being flameproof.

15. The apparatus as claimed in claim 11, wherein any gaps between said longitudinal slot and said plastic part having a width being flameproof.

16. The apparatus as claimed in claim 10, wherein the plastic part and the stop are made of polybutylene terephtalate.

17. The apparatus as claimed in claim 11, wherein the longitudinal slot has a depth being designed to prevent sparking across said slot.

18. The apparatus as claimed in claim 11, wherein the stop is formed with said baseboard.

19. The apparatus as claimed in claim 11, wherein said stop resting against said internal wall.

20. The apparatus as claimed in claim 11, wherein said lead arrangement including a flat cable.

* * * * *